United States Patent
Song

(10) Patent No.: US 7,197,306 B1
(45) Date of Patent: Mar. 27, 2007

(54) APPARATUS AND METHOD OF REGISTERING HOME-ZONE LOCATION IN PORTABLE RADIO TELEPHONE

(75) Inventor: Sang-Uuk Song, Songnam-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 278 days.

(21) Appl. No.: 09/632,995

(22) Filed: Aug. 4, 2000

(30) Foreign Application Priority Data

Aug. 11, 1999 (KR) .................................... 99-32984

(51) Int. Cl.
*H04Q 7/20* (2006.01)
(52) U.S. Cl. ......................................... 455/436; 455/440
(58) Field of Classification Search ................ 455/432, 455/436, 439, 406, 433, 435, 422.1, 425, 455/437, 438, 443, 442, 440, 435.1, 432.1, 455/432.3, 419
See application file for complete search history.

(56) References Cited

U.S. PATENT DOCUMENTS

| | | | | |
|---|---|---|---|---|
| 4,028,500 A | * | 6/1977 | McClure et al. ............... 179/90 |
| 5,642,398 A | * | 6/1997 | Tiedemann et al. .......... 455/426 |
| 5,734,977 A | * | 3/1998 | Sanmugam .................. 455/410 |
| 6,128,489 A | * | 10/2000 | Seazholtz et al. ......... 455/432.1 |
| 6,148,197 A | * | 11/2000 | Bridges et al. ............. 455/432 |
| 6,321,090 B1 | * | 11/2001 | Soliman ..................... 455/440 |
| 6,345,184 B1 | * | 2/2002 | van der Salm et al. ...... 455/432 |
| 6,456,839 B1 | * | 9/2002 | Chow et al. ................. 455/408 |

FOREIGN PATENT DOCUMENTS

EP  0915631 A2  5/1999

\* cited by examiner

*Primary Examiner*—Edward F. Urban
*Assistant Examiner*—Tu X. Nguyen
(74) *Attorney, Agent, or Firm*—Cha & Reiter, L.L.C.

(57) ABSTRACT

An apparatus and method used in a home-zone location registering process in a portable telephone which allows a different charging rate to be applied to a subscriber based on whether the call connection is made within the home-zone area. According to the method, the portable radio telephone stores the home-zone list therein and determines whether the portable telephone deviates from the home zone area, then the portable radio telephone automatically performs the location registration process when the deviation is detected.

15 Claims, 6 Drawing Sheets

APPARATUS AND METHOD OF REGISTERING HOME-ZONE LOCATION IN PORTABLE RADIO TELEPHONE

CLAIM OF PRIORITY

This application makes reference to and claims all benefits accruing under 35 U.S.C. Section 119 from an application for APPARATUS AND METHOD OF REGISTERING HOME-ZONE LOCATION IN PORTABLE RADIO TELEPHONE filed earlier in the Korean Industrial Property Office on Aug. 11, 1999 and there duly assigned Serial No. 32984/1999.

BACKGROUND OF THE INVENTION

1. Field of the Invention

The present invention relates to a home-zone service in a mobile radio communication system, and more particularly to an apparatus and method for registering the home-zone location in a portable radio telephone.

2. Description of the Related Art

Under the current billing scheme, a connection charging fee relating to a wireless service fee is higher than a wired service fee. Naturally, mobile subscribers will attempt to use the wired service if they are inside their home or office to save money under the current billing practice. If such a billing difference were not practiced, it would not be necessary for the mobile telephone subscriber to separately own a wired telephone set.

To attract more subscribers, phone companies are offering a unique service feature known as the home-zone service, which allows mobile subscribers to designate a specified region to benefit the lower billing rate when using their mobile phones. Thus, the boundary of a home-zone service can be predetermined and a different billing rate when the mobile phone is used inside the home zone. For example, if a mobile telephone subscriber designates his/her house as his/her home zone, a lower charging rate equivalent to a wired connection call is billed. Other different features and options are also available in the home-zone service.

FIG. 1 is a block diagram illustrating the construction of a mobile radio communication system. The reference numeral 20 denotes a radio frequency (RF) equipment, such as a base transceiver station (BTS) for performing radio communication with the mobile terminal 10 of a subscriber. A base station controller (BSC) 30 controls the base transceiver station 20 to perform the call processing operation or the channel allocation. A mobile switching center (MSC) 40 serves to link the base station controller 30 to a public switched telephone network (PSTN) 50 or another base transceiver station. The mobile switching center 40 obtains the subscriber information from a visitor location register (VLR) 60 and a home location register (HLR) 70. The visitor location register 60 temporarily stores information relating to the subscriber. The home location register 70 also stores therein the subscriber information. Here, the subscriber information relates to terminal information, subscriber information, subscriber home-zone information, additional service information, etc.

FIG. 2 illustrates the boundary of a home-zone service area. As shown in FIG. 2, the home-zone service area is determined by three base transceiver stations 21 to 23. The respective base transceiver station is divided into three sectors α, β, and γ. Thus, the home-zone list for the mobile terminal 10 can be further narrowed using the sector α of the base transceiver station 21, the sector β of the base transceiver station 22, and a sector γ of the base transceiver station 23.

FIG. 3a illustrates the process of generating a home-zone list during the registration process. Information relating to the home-zone list of a subscriber is registered in the home location register (HLR). The mobile switching center (MSC) determines whether a particular mobile terminal is located inside or outside the home zone using cell identification (cell_ID), sector identification (sector_ID), and round trip delay (RTD) information included in the location update message signal transmitted from the mobile terminal. Then, the MSC transmits its determination to the base transceiver station (BTS). The BTS in turn transmits the same determination back to the mobile terminal so that a subscriber can be informed accordingly.

FIG. 3b illustrates the process of referring to the home-zone list when a call is originated or terminated. If a mobile terminal originates a call, the mobile switching center transmits a channel assign request message, which includes the home-zone list of the subscriber and the mobile phone information. The base station controller (BSC), upon receiving this request, determines whether the mobile terminal is located within the home zone by comparing the current location of the subscriber with the information stored in the home-zone, then informs the mobile switching center (MSC) of the determination via a channel assign complete message. The MSC maintains the corresponding call if it is determined that the mobile terminal is located inside the home zone area based on the information received from the base station controller but releases the call otherwise.

Sometimes, a subscriber can restrict the use of the mobile terminal to only within the home zone area. In this case, if the subscriber is located outside the home zone, the call connection can not be performed. If such a service is requested by the subscriber, the current MSC is designed to page the mobile terminal to notify the subscriber and allocates a channel to the corresponding mobile terminal. Thus, such unnecessary determination causes waste of resources in the present system. This waste occurs because the MSC is not notified by the mobile terminal when the terminal moves outside the home zone area.

SUMMARY OF THE INVENTION

Accordingly, the present invention has been made in efforts to solve the problems occurring in the related art, and an object of the present invention is to provide the apparatus and method of registering a home-zone location by a portable radio telephone.

In order to achieve the above object, according to the present invention, there is provided a home-zone location registering method using a portable radio telephone for a home-zone service to provide at a first charging rate for a telephone call made inside a predetermined home zone and a second charging rate for a telephone call made outside the home zone, the method comprising the steps of receiving a home-zone list downloaded from a home location register; checking whether the phone deviates from the home zone after downloading the home-zone list; and, informing the mobile switching center of the deviation of the phone.

In another aspect of the present invention, there is provided a home-zone location registering apparatus using a portable radio telephone for a home-zone service to provide at a first charging rate for a telephone call made inside a predetermined home zone using the portable radio telephone and a second charging rate for a telephone call made outside the home zone, the apparatus comprising a memory for storing a home-zone list in the portable radio telephone; a receiving section for receiving a predetermined signal from a base transceiver station; a comparing section for checking whether the portable radio telephone deviates from the home zone by comparing a currently tuned base transceiver station with that of the home-zone list stored in the memory in accordance with the signal received by the receiving section; a location registration message generating section for confirming that the portable radio telephone deviates from the home zone if the base transceiver station identical to the currently tuned base transceiver station does not exist in the home-zone list, and for generating a location registration message to attempt a location registration to the mobile switching center; and, a transmitting section for transmitting the generated location registration message to the base transceiver station.

BRIEF DESCRIPTION OF THE DRAWINGS

The above object and advantages of the present invention will become more apparent by describing in detail the preferred embodiments with reference to the attached drawings in which.

DETAILED DESCRIPTION OF THE PREFERRED EMBODIMENTS

The preferred embodiments of the present invention will now be explained in detail with reference to the accompanying drawings. In the following description of the present invention, many specified items such as detailed circuit elements are indicated, but they are provided only for a complete understanding of the present invention and thus it will be understood by those skilled in the art that the present invention can be performed without such specified items. For the purpose of clarity, a detailed description of known functions and configurations incorporated herein will be omitted as it may make the subject matter of the present invention unclear.

Figure 1:
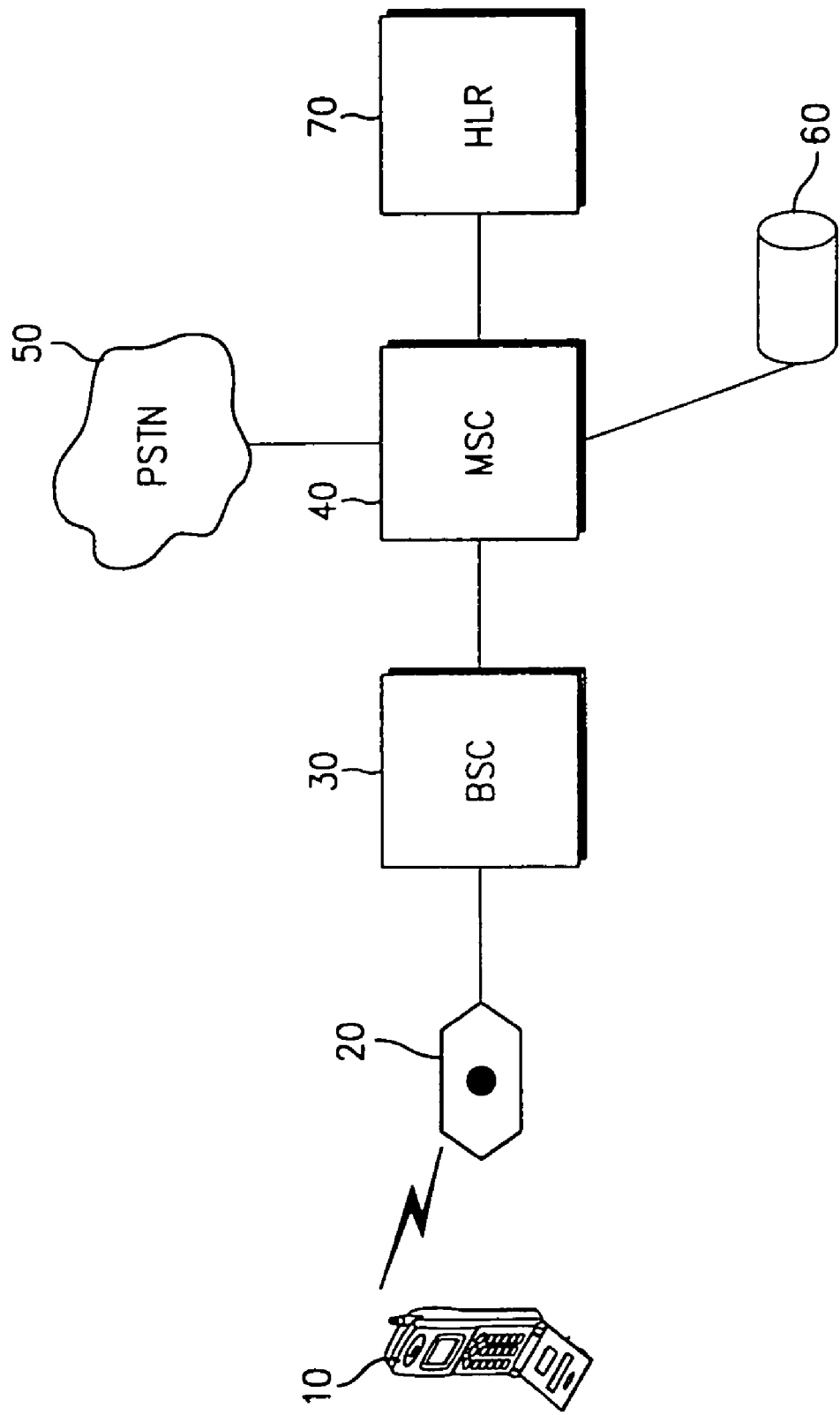
FIG. 1 is a block diagram illustrating the construction of a typical mobile radio communication system.
Figure 2:
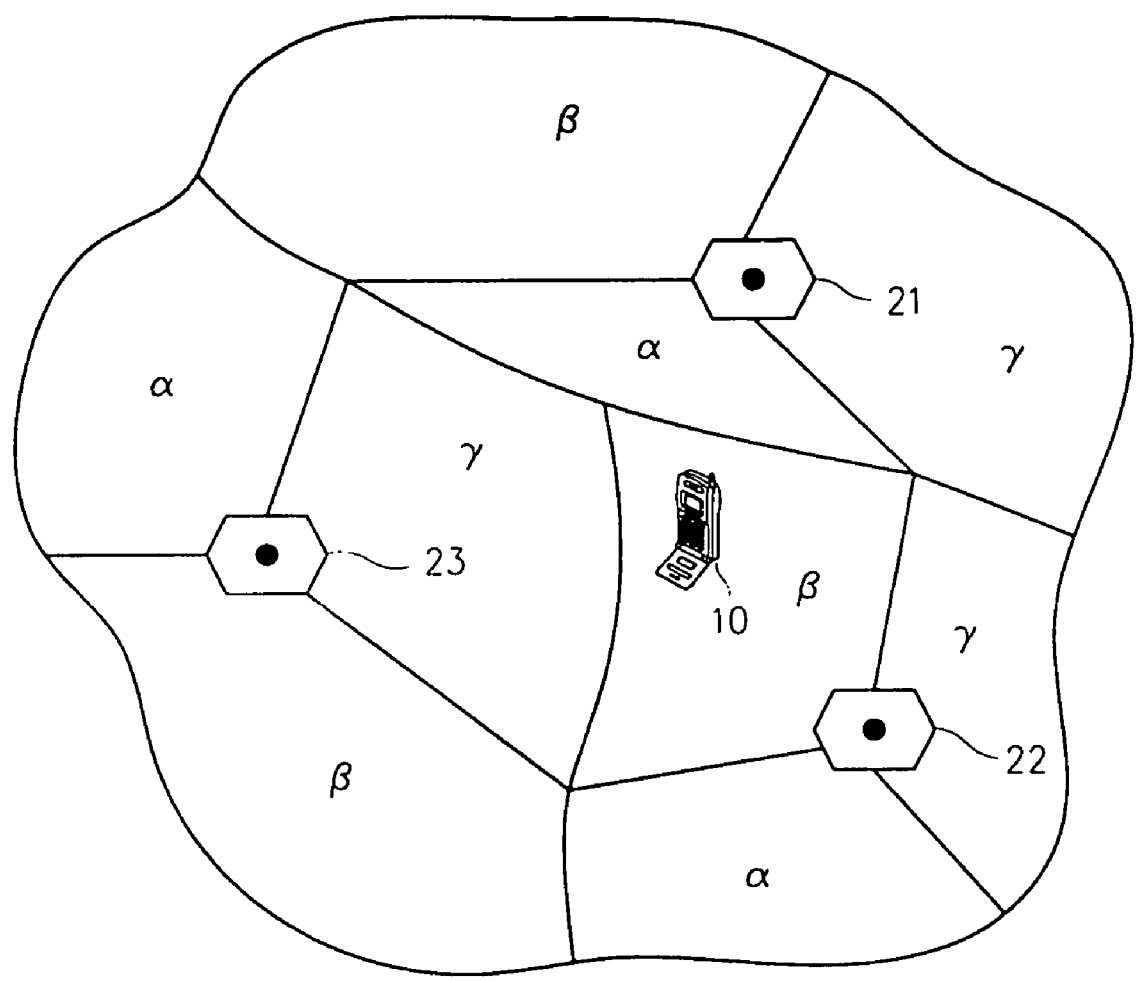
FIG. 2 is a view illustrating how the boundary of a home-zone service area is defined.
Figure 3A:
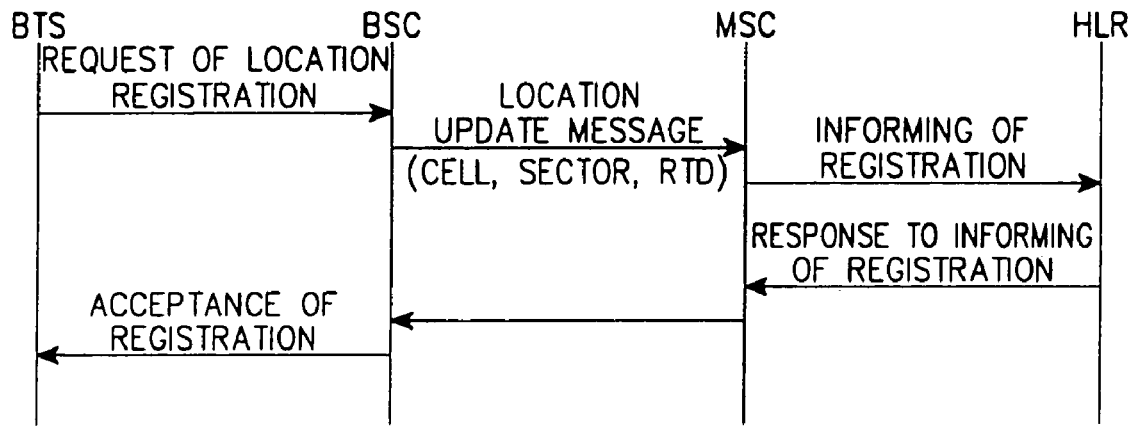
FIG. 3a is a view illustrating the process of registering the home-zone list.
Figure 3B:
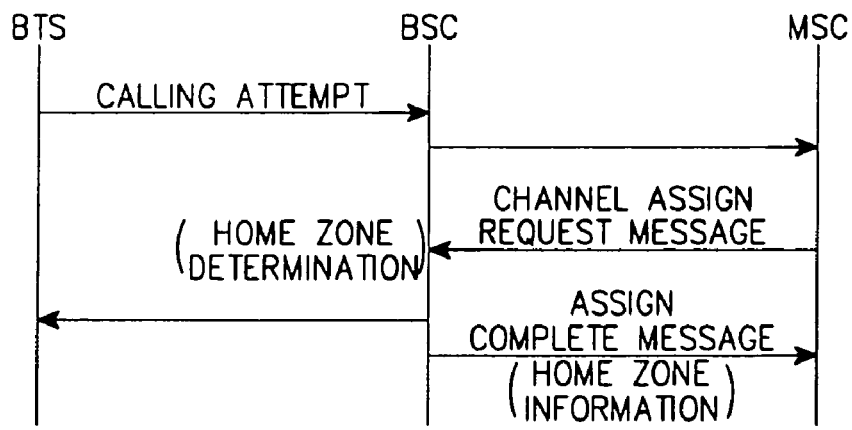
FIG. 3b is a view illustrating the process of referring to the home-zone list when a call is originated or terminated.
Figure 4:
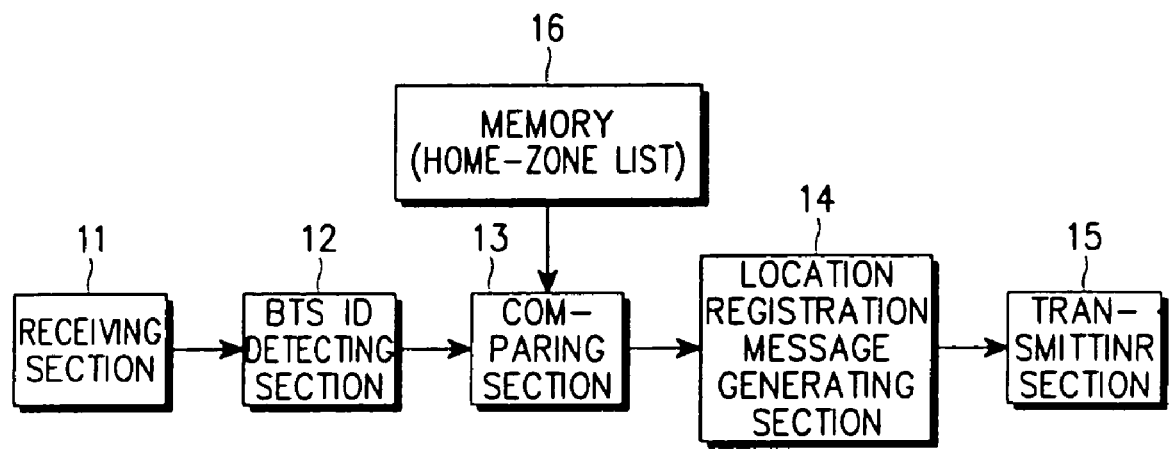
FIG. 4 is a block diagram illustrating the construction of a home-zone location registering apparatus for a portable radio telephone according to the embodiment of the present invention.

FIG. 4 is a block diagram illustrating the construction of a home-zone location registering device of a portable radio telephone according to the embodiment of the present invention.

A receiving section 11 receives a signal transmitted from the base transceiver station (BTS). A BTS ID detecting section 12 (i.e., sector identification (ID) or pseudo noise (PN) code) detects the base transceiver station ID (or sector ID or PN code) from the received signal. The base transceiver station ID is transmitted via a paging channel. A memory 16, which comprises a flash memory, stores therein the home-zone list. The information in the home-zone list includes the base transceiver station ID, sector ID, or PN code. A comparing section 13 confirms whether the detected base transceiver station ID (or sector ID or PN code) is listed in the home-zone list stored in the memory 16. A location registration message generating section 14 determines that the portable radio telephone deviates from the home zone if the base transceiver station ID is not listed in the home-zone list, then generates and provides the message for performing the location registration to the mobile switching center. A transmitting section 15 serves to transmit the generated location registration message to the mobile switching center (MSC).

Figure 5:
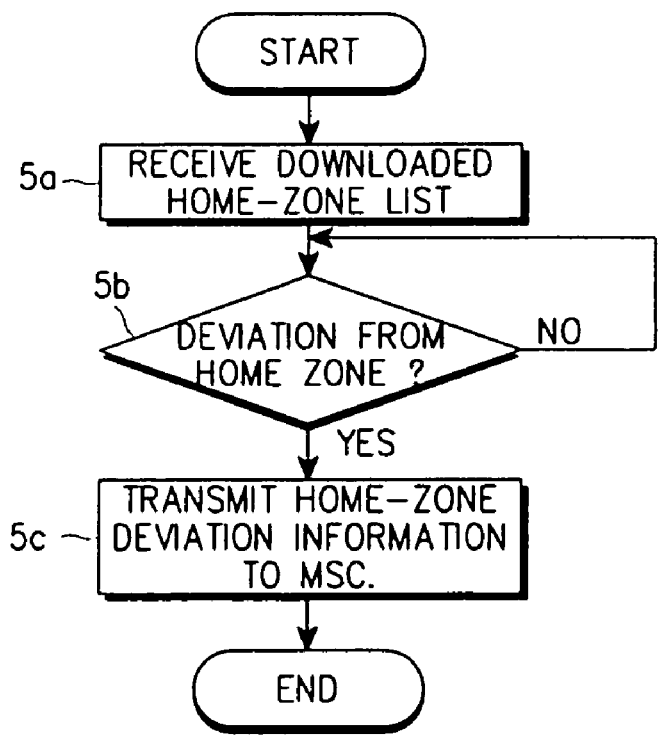
FIG. 5 is a flowchart illustrating a home-zone location registering method for a portable radio telephone according to the embodiment of the present invention.

FIG. 5 is a flowchart illustrating the home-zone location registering process for a portable radio telephone according to the embodiment of the present invention.

With reference to FIG. 5, the mobile terminal receives the downloaded home-zone list in step 5a. Then, in step 5b, it determines whether the mobile station deviates from the boundary of the home zone area. The deviation of the mobile terminal from the home zone is mainly caused by the roaming of the subscriber. The determination of home-zone deviation is made based on whether the PN code or the base transceiver station ID detected from the received signal exists in the previously recorded home-zone list. If the mobile terminal deviates from the home zone, the mobile terminal transmits the home-zone deviation information to the mobile switching center in step 5c.

Figure 6:
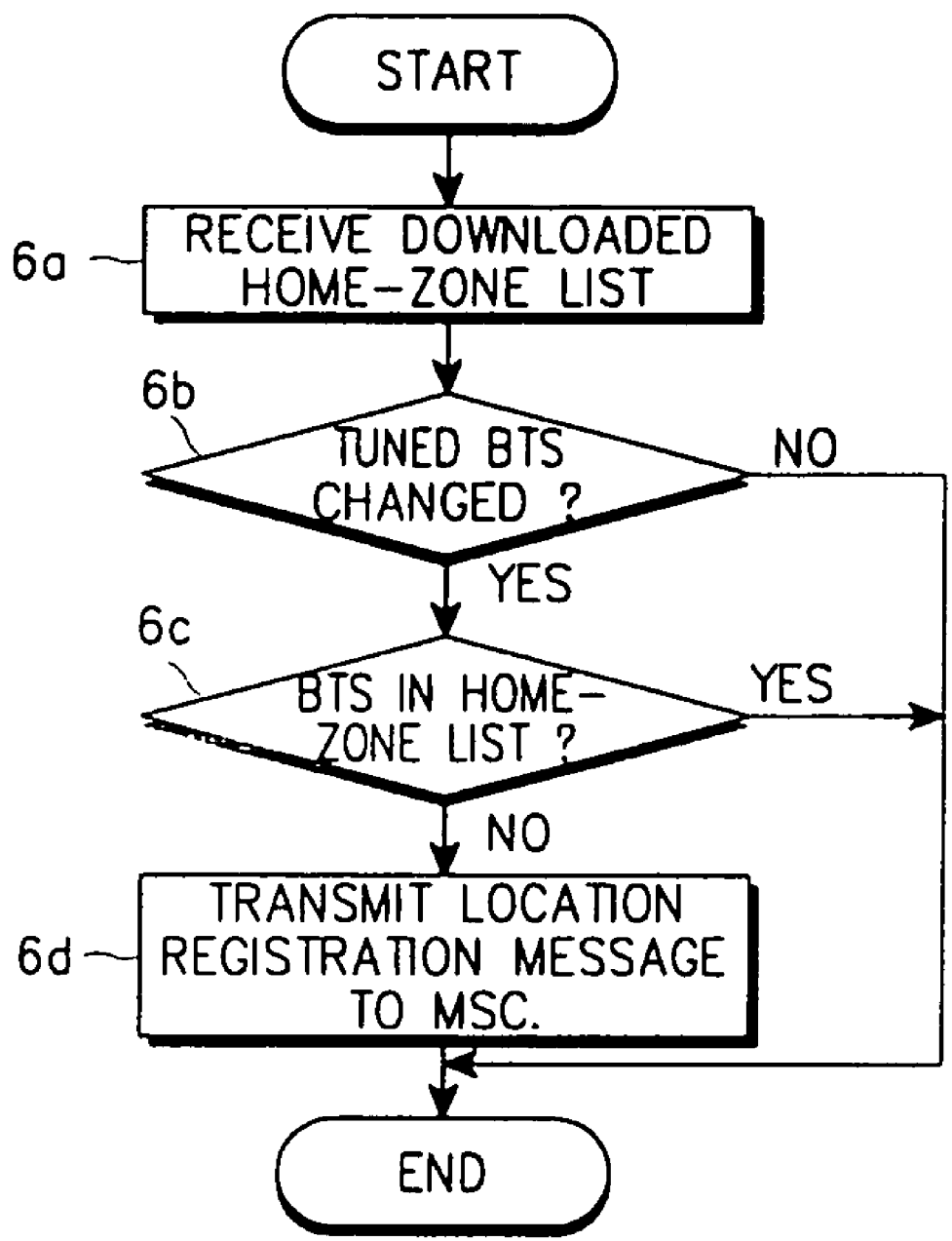
FIG. 6 is a flowchart illustrating a home-zone location registering method for a portable radio telephone according to another embodiment of the present invention; and, FIG. 7 is a flowchart illustrating a home-zone location registering method for a portable radio telephone according to another embodiment of the present invention.

FIG. 6 is a flowchart illustrating a home-zone location registering method for a portable radio telephone according to another embodiment of the present invention. With reference to FIG. 6, the mobile terminal receives the downloaded home-zone list information in step 6a, then determines whether the currently tuned base transceiver station is changed to another base station in step 6b. At this time, if it is determined that the tuned base transceiver station is changed, the mobile terminal determines whether the changed base transceiver station corresponds to a base transceiver station listed in the home-zone list in step 6c. If the changed base transceiver station does not exist in the home-zone list, the mobile terminal transmits the location registration message to the mobile switching center in step 6c.

Figure 7:
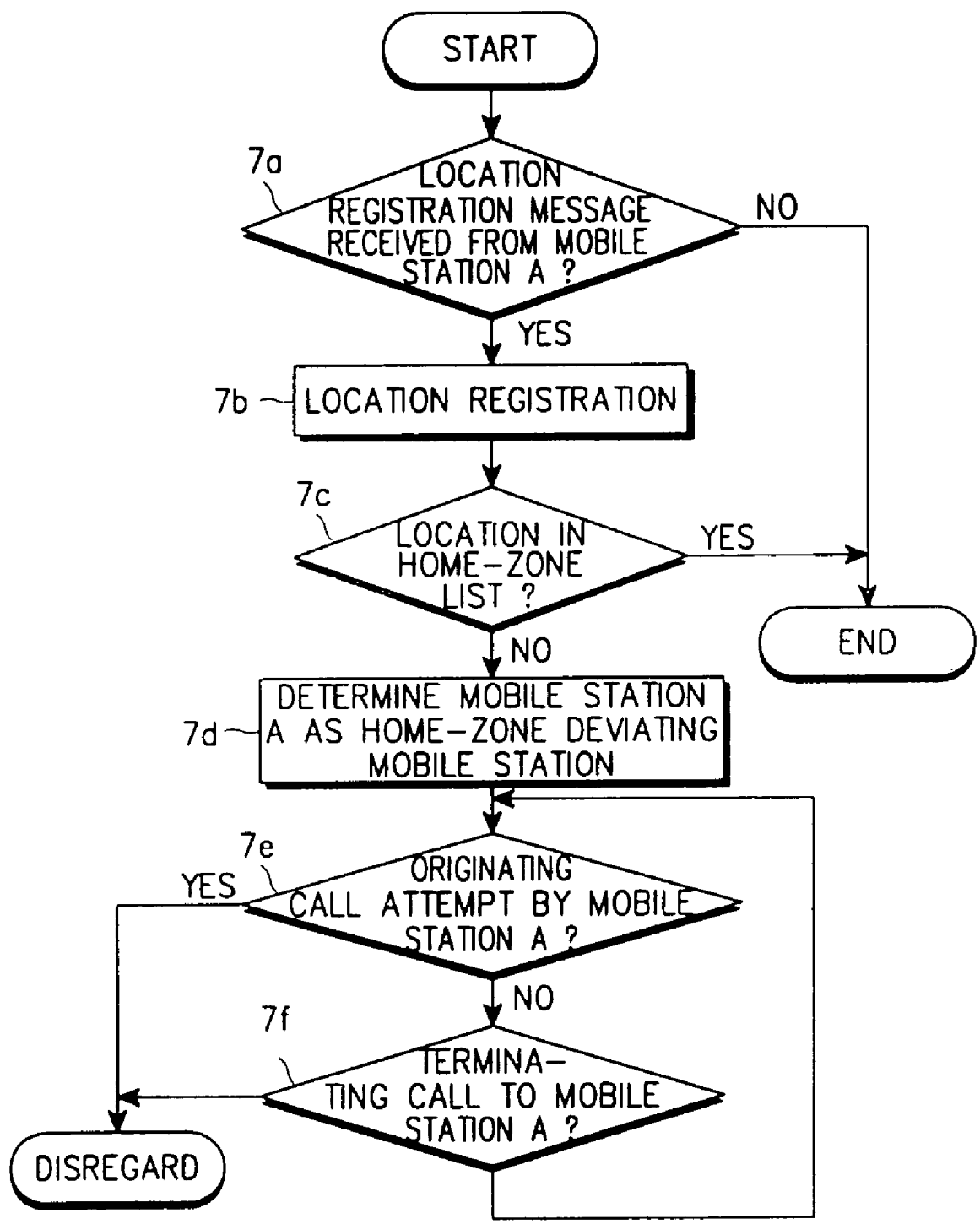

FIG. 7 is a flowchart illustrating a home-zone location registering method for a portable radio telephone according to yet another embodiment of the present invention. With reference to FIG. 7, the mobile switching center (MSC) determines whether the location registration message is received from a portable radio telephone in step 7a. If the location registration message is received from the portable radio telephone, the MSC registers the location of the radio telephone in step 7b. Then, the MSC determines whether the registered location is listed in the home-zone list in step 7c. If the registered location is not found in the home-zone list, the MSC determines that the portable radio telephone has deviated from the home zone area in step 7d. Then, the MSC determines whether the portable radio telephone is attempting a call origination in step 7e. If it is determined that the portable radio telephone is not attempting the call origination, the MSC determines whether a call termination to the portable radio telephone is generated in step 7f. That is, it is determined whether the portable radio telephone is receiving a call from another subscriber. If the call termination is not detected, the MSC returns to step 7e. However, if the portable radio telephone is attempting a call origination in step 7e or if a call termination is generated to the portable radio telephone in step 7f, the MSC disregards the request for the call origination or the call termination since the radio portable has deviated from the home zone area.

As described above, according to the present invention, the mobile terminal stores the home-zone list therein, and if the terminal deviates from the home zone area, the terminal activates the location registration process to the mobile switching center, so that the unnecessary paging and the channel allocation by the MSC in the prior art system is prevented. As a result, the load of the mobile switching center can be reduced.

While this invention has been described in connection with what is presently considered to be the most practical and preferred embodiments, it is to be understood that other modifications thereof may be made without departing from the scope of the invention. Thus, the invention should not be limited to the disclosed embodiment but should be defined by the scope of the appended claims and their equivalents.

What is claimed is:

1. A home-zone location registering method for a mobile switching center (MSC) for a home-zone service that charges at a first charging rate for a telephone call made inside a predetermined home zone and at a second charging rate for a telephone call made outside the home zone, the method comprising the steps of:
   checking whether a location registration request is received from a portable radio telephone;
   if the location registration request is received, checking whether the portable radio telephone deviates from the home zone by checking whether the current position of the portable radio telephone is included in a home-zone list;
   upon receiving a call origination from the portable radio telephone, releasing the call origination if the portable radio telephone is deviated from the home zone;
   disregarding a call termination if the portable radio telephone deviated from the home zone receives the call termination; and,
   preventing a paging by the MSC to notify the portable radio telephone that the portable telephone deviated from the home zone.

2. The method as claimed in claim 1, further comprising the step of informing the portable radio telephone when the call origination or the call termination is released.

3. The method as claimed in claim 1, further comprising the step of downloading the home-zone list in a memory means of the portable radio telephone.

4. The method as claimed in claim 1, wherein the first charging rate corresponds to a wired telephone call rate and the second charging rate corresponds to a radio telephone call rate.

5. A home-zone location registering apparatus for a portable radio telephone for a home-zone service that charges at a first charging rate for a telephone call made inside a predetermined home zone and at a second charging rate for a telephone call made outside the home zone, the apparatus comprising:
   a memory for storing a home-zone list;
   a receiving section for receiving a predetermined signal from a base transceiver station (BTS);
   a comparing section for checking whether the portable radio telephone deviates from the home zone by comparing the predetermined signal from the BTS with the home-zone list stored in the memory;
   a location registration message generating section coupled to the comparing section for generating a location registration message to attempt a location registration to the mobile switching center when the BTS information is not included in the home-zone list;
   a transmitting section for transmitting the generated location registration message from the location registration message generating section to the BTS.

6. The apparatus as claimed in claim 5, wherein the signal transmitted from the BTS includes a base transceiver station identification (BTS ID) information.

7. The apparatus as claimed in claim 5, wherein the BTS ID information is transmitted via a paging channel.

8. The apparatus as claimed in claim 7, wherein the home-zone list includes a cell identification, a sector identification, and maximum and minimum round trip delay field information, defining the home zone.

9. The apparatus as claimed in claim 5, wherein the memory comprises a flash memory for storing the home-zone list.

10. A home-zone location registering apparatus for a portable radio telephone for a home-zone service that charges at a first charging rate for a telephone call made inside a predetermined home zone and at a second charging rate for a telephone call made outside the home zone, the apparatus comprising:
    a memory for storing a home-zone list;
    a receiving section for receiving a predetermined signal from a base transceiver station BTS;
    a comparing section for checking whether the portable radio telephone deviates from the home zone by comparing the home-zone list to a sector of a currently tuned base transceiver station from the signal received by the receiving section;
    a location registration message generating section for confirming that the portable radio telephone deviates from the home zone if the sector of the BTS identical to the sector of the currently tuned BTS does not exist in the home-zone list and for generating a location registration message to attempt a location registration to the mobile switching center; and
    a transmitting section for transmitting the generated location registration message to the base transceiver station.

11. The apparatus as claimed in claim 10, wherein the home-zone list includes a cell identification, a sector identification, and maximum and minimum round trip delay field information, defining the home zone.

12. The apparatus as claimed in claim 10, wherein the memory comprises a flash memory for storing the home-zone list.

13. A home-zone location registering apparatus for a portable radio telephone for a home-zone service that charges at a first charging rate for a telephone call made inside a predetermined home zone and at a second charging rate for a telephone call made outside the home zone, the apparatus comprising:
    a memory for storing a home-zone list;
    a receiving section for receiving a predetermined signal from a base transceiver station (BTS);
    a comparing section for checking whether the portable radio telephone deviates from the home zone by detecting a pseudo noise code of a currently tuned BTS from the signal received by the receiving section and for comparing the detected pseudo noise code with the home-zone list stored in the memory;

a location registration message generating section for confirming that the portable radio telephone deviates from the home zone if the pseudo noise code identical to the detected pseudo noise code does not exist in the home-zone list and for generating a location registration message to attempt a location registration to the mobile switching center; and, a transmitting section for transmitting the generated location registration message to the base transceiver station.

14. The apparatus as claimed in claim 13, wherein the home-zone list includes a cell identification, a sector identification, and maximum and minimum round trip delay field information, defining the home zone.

15. The apparatus as claimed in claim 13, wherein the memory comprises a flash memory for storing the home-zone list.

* * * * *